US012293072B1

(12) United States Patent
Walecka et al.

(10) Patent No.: US 12,293,072 B1
(45) Date of Patent: May 6, 2025

(54) GESTURE-ENABLED INTERFACES, SYSTEMS, METHODS, AND APPLICATIONS FOR GENERATING DIGITAL CHORD AND LYRIC COMPOSITIONS

(71) Applicant: MusicSketch, LLC, Atherton, CA (US)

(72) Inventors: John Lawrence Walecka, Atherton, CA (US); Michael Dewey Burks, Redwood City, CA (US)

(73) Assignee: MusicSketch, LLC, Atherton, CA (US)

( * ) Notice: Subject to any disclaimer, the term of this patent is extended or adjusted under 35 U.S.C. 154(b) by 0 days.

(21) Appl. No.: 18/986,252

(22) Filed: Dec. 18, 2024

Related U.S. Application Data

(60) Provisional application No. 63/611,283, filed on Dec. 18, 2023.

(51) Int. Cl.
  *G06F 3/04883*  (2022.01)
  *G06F 3/044*  (2006.01)
  *G10H 1/00*  (2006.01)

(52) U.S. Cl.
  CPC .......... *G06F 3/04883* (2013.01); *G06F 3/044* (2013.01); *G10H 1/0025* (2013.01); *G10H 2220/096* (2013.01)

(58) Field of Classification Search
  CPC .... G06F 3/04883; G06F 3/044; G10H 1/0025
  See application file for complete search history.

(56) References Cited

U.S. PATENT DOCUMENTS

| | | | | |
|---|---|---|---|---|
| 2009/0118849 | A1* | 5/2009 | Dery | H04N 23/64 700/94 |
| 2010/0287471 | A1* | 11/2010 | Nam | G06F 3/0482 345/173 |
| 2021/0390938 | A1* | 12/2021 | Morsy | G06F 3/0482 |
| 2022/0208156 | A1* | 6/2022 | Chen | G06F 3/0483 |
| 2023/0032765 | A1* | 2/2023 | Plazak | G06F 3/04817 |
| 2023/0120140 | A1* | 4/2023 | Morsy | H04R 3/00 84/625 |
| 2023/0335091 | A1* | 10/2023 | Morsy | G06F 1/165 |

* cited by examiner

*Primary Examiner* — Seth A Silverman
(74) *Attorney, Agent, or Firm* — Bryan Cave Leighton Paisner LLP

(57) ABSTRACT

A music composition application for mobile devices provides gesture-driven interfaces for rapidly creating digital music compositions with chord and lyric notations. In certain embodiments, a gesture-driven composer environment can be configured in various modes to enable end-users to input and align chord notations with lyric notations, align chord notations with beat notations, and incorporate the chord with musical scores. The chord notations can be stored as chord objects with embedded information that can be propagated across the different modes, and the application facilitates transitions among modes while maintaining consistent chord information. Gesture-based inputs allow users to easily insert, reposition, and customize chord notations. The application also provides audio playback functionality by translating the digital music composition into analog audio signals.

20 Claims, 10 Drawing Sheets

410 – Detect one or more gestures within a gesture-driven composer environment for inserting lyric notations in a digital music composition 420 – Detect one or more gestures within the gesture-driven composer environment for inserting chord notations into the digital music composition 430 – Determine alignment information that correlates positioning of the chord notations relative to the lyric notations 440 – Detect one or more gestures for aligning the chord notations with beat notations within the gesture-driven composer environment 450 – Store the chord notations, the lyric notations, and the alignment information with the digital music composition 460 – Translate the digital music composition to analog audio signals for playback

GESTURE-ENABLED INTERFACES, SYSTEMS, METHODS, AND APPLICATIONS FOR GENERATING DIGITAL CHORD AND LYRIC COMPOSITIONS

CROSS-REFERENCE TO RELATED APPLICATIONS

This application claims the benefit of, and priority to, U.S. Provisional Patent Application No. 63/611,283 filed on Dec. 18, 2023, which is incorporated herein by reference in its entirety.

TECHNICAL FIELD

This disclosure relates to improved gesture-based technologies and functionalities that enable digital music compositions, including chord and lyric accompaniments, to be rapidly defined, created, and/or modified. In some embodiments, these technologies can be deployed on mobile electronic devices having capacitive sensing mechanisms to facilitate rapid definition of digital music compositions.

BACKGROUND

Mobile devices, such as smart phones and tablets, have become commonplace in modern times. In comparison to many traditional desktop computer monitors, the touch screen displays on mobile electronic devices are often smaller in size (e.g., in many cases, 3-7 inches when measured diagonally across the touch screen displays). Additionally, unlike many desktop computing devices, the primary means to provide inputs to the electronic mobile devices is often by receiving inputs, selections, and/or gestures via the touch screen displays.

Aside from placing phone calls, mobile devices are widely used for diverse functionalities and serve as portable computers for many users. Many applications originally designed for desktop computers have now been transitioned to mobile applications (apps) for usage on mobile devices. In some examples, mobile devices may include apps for video streaming, text messaging, video conferencing, social networking, productivity, gaming, fitness tracking, navigation, and numerous other functions.

However, certain types of desktop applications may not easily transition to mobile apps due to their inherent complexity and design. For instance, applications that facilitate content creation often have a vast number of options and hierarchies of menus, which do not lend themselves well to the diminished screen sizes and touch screen input mechanisms on mobile devices. In attempting to transition such applications to a mobile environment, the user interfaces and extensive feature sets of such applications become cumbersome and difficult to navigate on mobile devices, hindering their functionality, usefulness, and user experience. In some cases, attempts to adapt these applications for mobile use may result in simplified versions that lack the full capabilities of their desktop counterparts. As a result, developers may face significant technical challenges in effectively translating the robust functionalities of certain desktop applications to the mobile environment while maintaining usability and performance.

Along these lines, effectively implementing a music composition application that enables the creation and playback of digital music compositions can be a complex and technically challenging task. This complexity can be attributed, at least in part, to the large quantity and variation of notations that can be used to convey desired music compositions. For example, in addition to specifying notes, each note can be varied in numerous ways (e.g., by varying note heads, note stems, note flags, accidentals, etc.).

Implementing features that permit chords to be added and customized is particularly technically challenging, as thousands of possible permutations are possible. The complexity arises from the numerous components that make up a chord notation, including the root note, accidentals, chord quality indicators, and optional bass notes. Each of these components can be varied in multiple ways, leading to a vast number of potential chord combinations. For instance, the root note alone can be represented by different letter names and modified with accidentals. The chord quality indicators, which specify whether a chord is major, minor, diminished, augmented, or any variation thereof, further multiply the possible permutations. Additionally, the inclusion of slash chords, where a different bass note is specified, adds another layer of complexity to the chord notation system. Thus, providing a music composition application on a mobile device that facilitates rapid generation of digital music compositions while accounting for these voluminous chord variations can be technically challenging.

The smaller display screens and input mechanisms typically utilized by mobile devices make it difficult to present options for precisely selecting and defining the voluminous chord symbol variations typically utilized to compose music compositions, and to correlate those chord symbol variations with lyrics, rhythms, or beats for the music compositions. For example, many music desktop composition applications require users to navigate through a hierarchy of menus, interfaces, and options to precisely input accurate symbol information that reflects desired chord notation types, and provide limited or no functionality for aligning chord notations with lyrics, rhythms, or beats for the music compositions. Simply resizing a desktop music composition application of this nature to fit a smaller mobile device display exacerbates the difficulty of composing, and significantly increases the time required to create music compositions (e.g., by requiring such navigation and selections to be made via a touchscreen device with a relatively small display).

While it may be tedious and undesirable to navigate through various menus, interfaces, and menus to customize music notations even on desktop computing devices, such many be tolerable on desktop computing devices that are connected to large displays, as well as input devices such as mouse devices and keyboards. However, the difficulties are worsened on mobile devices to point where a feasibility threshold is breached, which makes in impractical or unfeasible to compose music compositions on mobile devices.

The background description provided herein is for the purpose of generally presenting context of the disclosure. The materials described in this section are not prior art to the claims in this application and are not admitted to be prior art, or suggestions of the prior art, by inclusion in this section.

BRIEF DESCRIPTION OF DRAWINGS

To facilitate further description of the embodiments, the following drawings are provided, in which like references are intended to refer to like or corresponding parts, and in which:

FIG. 4 is a flow diagram illustrating method according to certain embodiments.

Figure 1A:
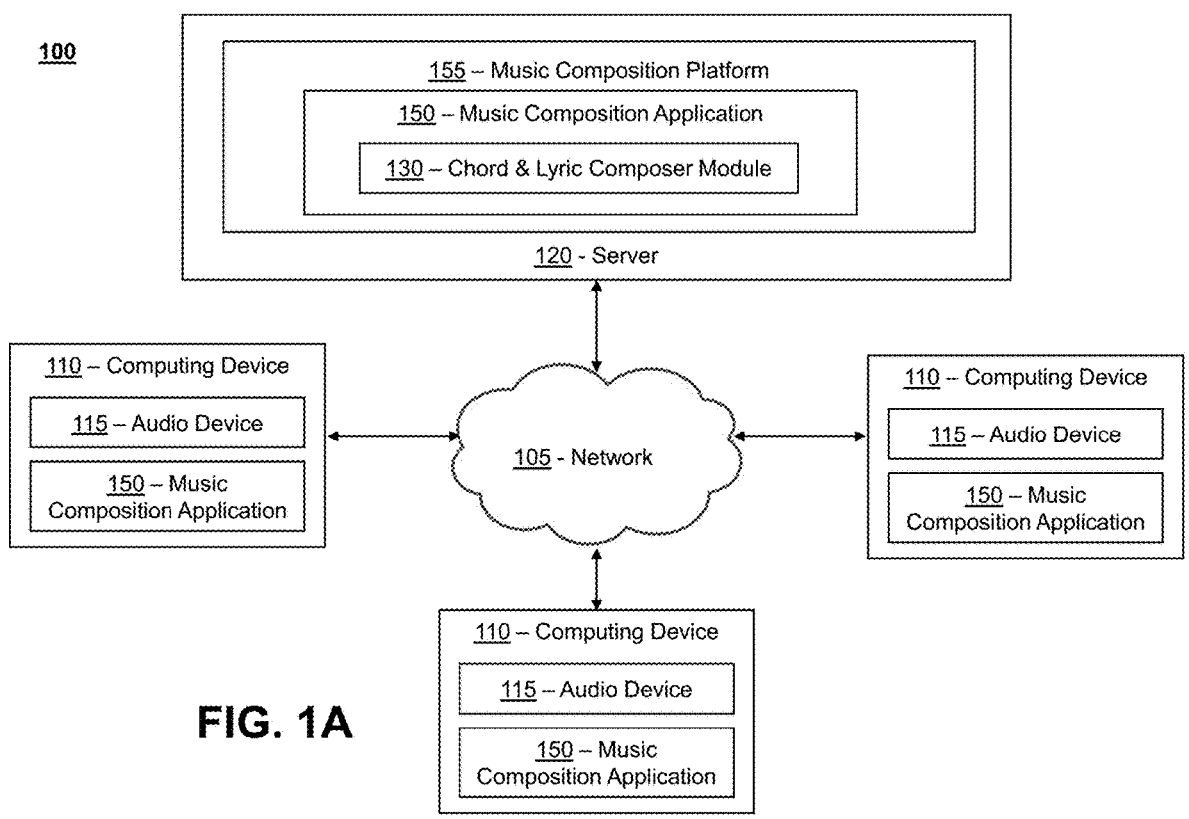
FIG. 1A is a block diagram of an exemplary system in accordance with certain embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

DETAILED DESCRIPTION

The present disclosure relates to systems, methods, apparatuses, and techniques for providing improved music composition applications. In certain embodiments, a music composition application can be specially designed and configured to optimize creation, editing, and/or sharing of music compositions on mobile electronic devices. Amongst other things, the music composition application can include a chord and lyric composer (CALC) module configured with functionalities and interfaces that facilitate rapid creation and/or editing of beats, rhythms, and lyrics for digital music compositions in mobile environments. These functionalities and interfaces described herein also can be beneficial for creating digital music compositions in desktop environments and/or other computing environments.

As explained in further detail below, the CALC module of the music composition applications can present specially gesture-driven interfaces that enable chord and lyric notations to be defined and/or edited in a compact space of mobile device display, thereby occupying minimal space on a display screen and enabling users to quickly generate rhythmic and beat notations for digital music compositions. In various embodiments, these gesture-driven interfaces are adapted to detect various gestures (e.g., tap, tap-and-hold, swipe, scroll, and/or other gestures) that facilitate rapid entry and customization of rhythmic and beat notations and lyric notations via touch screen input devices.

The embodiments described in this disclosure can be combined in various ways. Any aspect or feature that is described for one embodiment can be incorporated into any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Figure 1B:
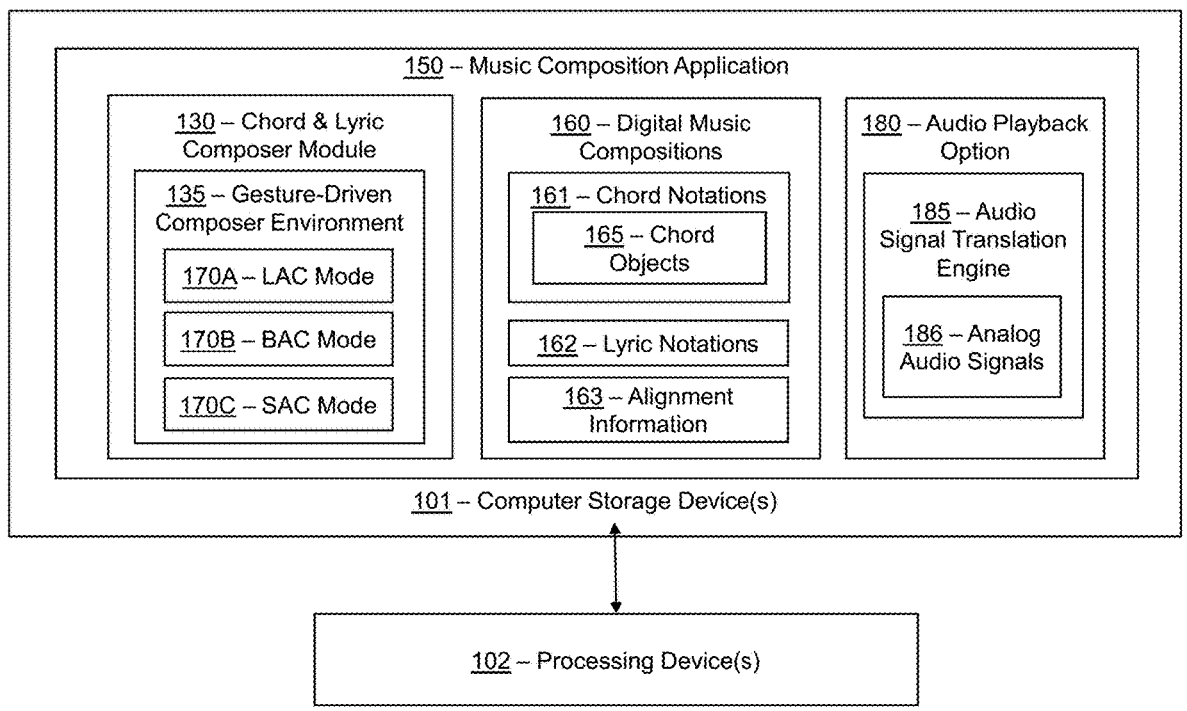
FIG. 1B is a block diagram illustrating exemplary features of a music composition application in accordance with certain embodiments.

FIG. 1A is a block diagram of an exemplary system 100 according to certain embodiments. FIG. 1B is a block diagram illustrating exemplary features of a music composition application in accordance with certain embodiments.

The system 100 comprises one or more computing devices 110 and one or more servers 120 that are in communication over a network 105. Each of the computing devices 110 can store and execute a music composition application 150, and each can include and/or be in communication with one or more audio devices 115. A music composition platform 155 can be stored on, and executed by, the one or more servers 120. The one or more servers 120 and/or music composition platform 155 also can include and/or execute one or music composition applications 150. The system 100 can include any number (e.g., one or multiple) of computing devices 110, audio devices 115, servers 120, music composition applications 150, and music composition platforms 155.

The network 105 may represent any type of communication network, e.g., such as one that comprises the Internet, a cellular network, a telecommunications network, a private intranet, a virtual private network (VPN), a local area network (e.g., a Wi-Fi® network), a personal area network (e.g., a Bluetooth® network), a wide area network, an intranet, a television network, and/or other types of networks.

All the components illustrated in FIG. 1A, including the computing devices 110, audio devices 115, servers 120, music composition applications 150, and music composition platforms 155 can be configured to communicate directly with each other and/or over the network 105 via wired or wireless communication links, or a combination of the two. Each of these components (e.g., each of the computing devices 110, audio devices 115, servers 120, etc.) also can be equipped with one or more communication devices (e.g., transceiver devices and/or wire-based communication devices or interfaces), one or more computer storage devices (e.g., computer storage device 101 in FIG. 1B), and one or more processing devices (e.g., computer storage device 102 in FIG. 1B) that are capable of executing computer program instructions. Each of these components also can include, or be connected to, one or more display devices (e.g., liquid crystal displays or LCDs, light emitting diode or LED displays, plasma displays, touchscreen displays, and/or other types of displays) and/or one or more input devices (e.g., keyboards, mouse devices, capacitive sensing devices, joysticks, gamepads, gaming controllers, track balls, microphones, touchpads, optical sensing devices, scanners, mechanical switches and buttons, camera devices, video devices, etc.).

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions.

The one or more computer storage devices 101 can include (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the computer storage devices can be physical, non-transitory mediums.

In certain embodiments, the computing devices 110 may represent or include mobile electronic devices (e.g., smart phones, tablet devices, personal digital assistants, tablet devices, wearable devices, and/or any other device that is mobile in nature). Additionally, or alternatively, the computing devices 110 can include desktop computers, laptop computers, gaming consoles (e.g., PlayStation®, Nintendo®, Xbox® and/or other gaming consoles) and/or other types of electronic devices. The one or more servers 120 may generally represent any type of computing device, including any of the computing devices 110 mentioned in this disclosure. In certain embodiments, the one or more servers 120 comprise one or more mainframe computing devices that are configured to communicate with the computing devices 110 and/or music composition applications 150 (and/or other applications and devices) over the network 105 (e.g., over the Internet and/or a cellular network in some scenarios).

As mentioned above, some or all of the computing devices 110 may represent mobile electronic devices in certain embodiments. Generally speaking, the mobile electronic devices can include any type of electronic device that is portable and/or transportable in nature. In some cases, a mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a cellular telephone (e.g., a smartphone), a personal digital assistant, a handheld digital computer device (e.g., a tablet personal computer device), a digital media player, a wearable device, and/or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, and/or similar products offered by Apple Inc. of Cupertino, California, United States of America; (ii) a Blackberry® or similar product by Research in Motion (RIM) of Waterloo, Ontario, Canada; (iii) a Lumia® or similar product by the Nokia Corporation of Keilaniemi, Espoo, Finland, and/or (iv) a Galaxy® or similar product by the Samsung Group of Samsung Town, Seoul, South Korea. Further, in the same or different embodiments, a mobile electronic device can comprise an electronic device configured to implement one or more of (i) the iOS® or iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android® operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

The mobile electronic devices can additionally, or alternatively, include wearable devices (e.g., wearable user computer devices) as mentioned above. Generally speaking, wearable devices can generally include any type of electronic device that is capable of be mounted to, worn by, and/or fixed to an individual. For example, in some cases, the wearable devices sometimes can be worn under or over clothing, and/or integrated with the clothing and/or other accessories (e.g., hats, eyeglasses, wristbands, watches, shoes, gloves, etc.). In some cases, wearable devices can be directly mounted or attached to individuals (e.g., the individuals' head, wrist, arms, legs, or neck regions). The wearable devices can comprise a head mountable wearable user computer device (e.g., one or more head mountable displays, one or more eyeglasses, one or more contact lenses, one or more retinal displays, etc.) and/or a limb mountable wearable user computer device (e.g., a smart watch). In some configurations, the wearable devices can be configured to present audio and/or visual data (e.g., text, images, videos, audio, music, etc.) and/or to receive inputs from individuals (e.g., via one or more input devices such as touchscreens, switches, buttons, etc.). The mobile electronic devices can include additional types of devices other than those explicitly mentioned herein.

In certain embodiments, the computing devices 110 can permit users to specify inputs or selections via the music composition applications 150 to create and/or edit the music compositions 160. For scenarios involving a computing device 110 that represents a mobile electronic device, the inputs or selections may be provided using gestures on a touch screen display and/or other input devices included on the mobile electronic devices. For scenarios involving a computing device that represents a desktop computer (or other similar device), the inputs or selections may alternatively, or additionally, be provided via keyboards, mouse devices, and/or other input devices.

In certain embodiments, the music composition applications 150 can be installed on the computing devices 110 as local applications. Additionally, or alternatively, the music composition applications 150 can be installed on the one or more servers 120, and the music composition applications 150 can be accessed (e.g., via a web browser) by the computing devices 110 over the network 105. For example, in some cases, the music composition platform 155 can provide the music composition applications 150 disclosed herein as a software-as-a-service and/or web-based application. Additionally, or alternatively, the music composition applications 150 can be installed on both the computing devices 110 and the servers 120 hosting the music composition platform 155. For example, the music composition applications 150 can be installed as front-end applications that communicate with one or more back-end applications stored on the one or more servers 120 and/or music composition platform 155. The music composition applications 150 can be installed and/or executed in other configurations and arrangements as well. Regardless of the particular arrangement, it should be recognized that any functionality of the music composition applications 150 described herein can be executed by the computing devices 110, servers 120, and/or a combination of the two.

In certain embodiments, the music composition platform 155 can represent an online platform that communicates with the computing devices 110 over the network 105, and provides various functions that support the functionality of the music composition applications 150 installed on the computing devices 110. For example, the music composition platform 155 can provide support functions related to verifying login requests, storing digital music compositions 160 created using the music composition applications 150, facilitating or authorizing requests to share digital music compositions 160, and/or other related functions.

The music composition applications 150 can enable users to create and/or edit any type of digital music composition 160 including, but not limited to, any type of instrumental and/or vocal music composition. In certain embodiments, the digital music compositions 160 created or edited using the music composition applications 150 can include musical notations, lyrical notations, and/or other music-related elements. For example, in some cases, the music composition applications 150 can enable users to add, edit, delete, and/or specify notations indicating notes, melodies, phrases, rhythms, lyrics, and/or harmonies. In certain embodiments, the music composition applications 150 can enable users to generate digital music compositions 160 comprising electronic sheet music, accompaniments, and/or scores that include notations.

As described throughout this disclosure, the music composition applications 150 can be configured to provide specially configured interfaces and functionalities that enable rapid generation of the digital music compositions 160. The music composition applications 150 can be configured to performed any of the functionalities described in U.S. Pat. No. 11,694,724 (filed as U.S. patent application Ser. No. 17/866,969 on Jul. 18, 2022 and issued on Jul. 4, 2023), which is incorporated by reference herein in its entirety.

In many embodiments, the music composition applications 150 can permit users to specify various types of notations to create the digital music compositions 160. Exemplary musical notations can include symbols and/or representations indicating staff notes (e.g., including note heads, note stems, and note flags), rests, clefs, chords, triplets, beaming, time signatures/meters, octaves/scale, tempo, accidentals (e.g. flats and sharps), measures, scores, pitches, rhythms, lyrics, and/or any other musical elements associated with a vocal or instrumental musical piece.

The music composition applications 150 also can include a chord and lyric composer (CALC) module 130 that enables end-users to rapidly define chord notations 161 and lyric notations 162 corresponding to the digital music compositions 160. Amongst other things, the CALC module 130 can provide access to gesture-enhanced GUIs that enable end-users to rapidly compose beats, rhythms, and lyrics for the digital music compositions 160 on mobile devices (and/or other types of computing devices 110).

The CALC module 130 permits users to define, customize, and/or input various chord notations 161 and lyric notations 162 in a gesture-driven composer environment 135 to create the digital music compositions 160. In some scenarios, the chord notations 161 and lyric notations 162 generated using the CALC module 130 can be inserted to create accompaniments for digital music compositions 160, e.g., which may complement the main melody or musical part of a digital music composition 160. Additionally, or alternatively, the chord notations 161 and lyric notations 162 generated using the CALC module 130 can be separate or standalone digital music compositions 160 that are not incorporated with other melodies or musical parts.

As explained above, inputting and defining chord notations 161, and other types of notations, for a digital music composition 160 can be complex due, at least in part, to the large number of variations that are possible. One problem associated with traditional composition applications is that they do not enable users to rapidly select and customize desired notations, nor do they provide a user-friendly mechanism for inserting the chord notations into a musical composition. Other problems associated with traditional composition applications is that they do not permit users to rapidly correlate chord notations 161 with beat or rhythm information for a song or composition, or align the chord notations 161 with lyrics for the song or composition. This is especially true for traditional composition applications that are used on mobile electronic devices, which often have diminished display space and touch screen input devices.

As explained in further detail below, the gesture-driven functionalities and interfaces provided by the music composition applications 150 (e.g., provided to users via the computing devices 110) can be optimized to enable creation and editing of chord, lyric, and beat accompaniments or compositions on mobile electronic devices and/or touch screen devices in a user-friendly and rapid manner. In certain embodiments, the music composition applications 150 can permit creation and editing of chord accompaniments or compositions using specially configured gesture-based inputs and interface configurations.

In certain embodiment, the music composition application 150 can facilitate the creation of a music composition 160 in multiple editing modes, including a LAC (lyric and chord) mode 170A, BAC (beat and chord) mode 170B, and/or SAC (score and chord mode) mode 170C. Each of these editing modes can provide GUIs that are configured with a gesture-driven composer environment 135 that enables chord notations 161 to be inserted and customized using intuitive and user-friendly gesture input processes. In the LAC mode 170A, a gesture-driven composer environment 135 is provided that enables a precise positioning and correlation of chord notations 161 with corresponding lyric notations 162 for the digital music composition 160. In the BAC mode 170B, a gesture-driven composer environment 135 is provided that enables a precise positioning and correlation of chord notations 161 on beats within measures of the digital music composition 160. In the SAC mode 170C, a gesture-driven composer environment 135 is provided that enables a precise positioning and correlation of chord notations 161 on musical scores or staffs associated with the digital music composition 160. As an end-user refines a digital music composition 160 across the various editor modes, the digital music composition 160 can be updated to store alignment information 163 that determines or associates positioning of the chord notations 161 relative to lyric notations 162, beats, measures, and/or scores for the digital music composition 160.

As explained in further detail, the music composition application 150 can employ a unique data model to store data associated with chord notations 161. In certain embodiments, each chord notation 161 may be stored and defined using a chord object 165 that comprises a data structure embedded with various information, such as data that captures the text associated with the chord, a pointer or reference to a separate data structure(s) that defines the visual characteristics of the chord notation 161, position in time information associated with the chord notation 161, and the notes that are associated with chord notation 161 (which can include the octave of the note). The embedded data included in the chord object 165 permits the chord notation 165 to be displayed and edited across various editing modes (including the LAC mode 170A, BAC mode 170B, and/or SAC mode 170C) in a standardized fashion, and facilitates the conversion of the chord notation 161 to analog signals during audio playback.

In one exemplary use case, an end-user seeking to create a digital music composition 160 may access the music composition application 150, and select an option to create a new digital music composition 160. In response to the end-user's selection, the CALC module 130 may then present the end-user with a GUI that enables a time signature and the key for the digital music composition 160 to be specified for the digital music composition 160. For example, the end-user may be presented with options to define a time signature (e.g., a 4/4 time signature, 6/8 time signature, ¾ time signature, 2/4 time signature, and/or other time signature) and a tonal center or key (e.g., C major, D major, F#major, Bb major, and/or other key) for the new digital music composition 160. Once the time signature and key are specified for the digital music composition 160, the CALC module 130 may present, or provide access to, a gesture-driven composer environment 135 in a LAC mode 170A that enables the end-user to enter chord notations 161 for defining a beat or rhythm for the digital music composition 160 using various chord notations 161, and to align and correlate the chord notations 161 with lyric notations 162 for the for the digital music composition 160. The end-user can then transition the music composition application 150 to a BAC mode 170B to more precisely align chord notations 161 with a beat or rhythm for the digital music composition 160 and/or to a SAC mode 170C to correlate the chord notations 161 with scores for the digital music composition 160. As the end-user switches between different editor modes to refine and adjust the digital music composition 160, the system may access and update the embedded information for the chord notations 161, which is stored according to the defined data model. This allows the chord information to remain consistent and accurate across all editing modes.

Exemplary features, functionalities, and interfaces associated with the CALC module 130 and music composition application 160 are described in further detail below with reference to FIGS. 3A-3F. Amongst other things, the description of these figures demonstrate how the gesture-driven composer environment 135 permits an end-user to rapidly define or input chord notations 161 and lyric notations 162 for creating or editing a digital music composition 160.

The digital music compositions 160 created (or being created) using the music composition application 150 can be output and/or played on one or more audio devices 115 in response to selecting an audio playback option 180 presented via the music composition application 150. The audio devices 115 may include speakers, audio cards, and/or other types of devices that generate or output audio signals 194. In some cases, the audio devices 115 can be integrated into the computing devices 110 utilized to create or edit the digital music compositions 160 and/or operated by end-users. Additionally, or alternatively, the audio devices 115 can be separate devices (e.g., external speakers) that communicate with the computing devices 110 (e.g., via a wired and wireless connections over a LAN and/or PAN). In the case of the latter, the computing devices can stream or otherwise provide audio to the audio devices 115 to enable listening of the digital music compositions 160.

In some embodiments, the music composition application 150 can include an audio signal translation engine 185 configured to perform a digital-to-audio conversion (DAC) that translates the digital music compositions 160 (and notations associated therewith) to analog audio signals 186. In some embodiments, the audio signal translation engine 185 can include a synthesizer and/or sampler that aids in this the translation process.

In some examples, a digital music composition 160 created or edited using the music composition application 150 is stored in a digital file or digital format, such as a MIDI (musical instrument digital interface) format, MusicXML format, and/or other appropriate format. The audio signal translation engine 185 then interprets the notation information (e.g., time signature, keys, chords, beats, etc.) for the digital music composition 160, and a software-based synthesizer or sampler then generates audio signals based on the notation information (e.g., which can involve generating waveforms that represent the different instruments, chords, notes and musical components in the digital music composition 160). A DAC (digital-to-analog conversion) can then be utilized to generate a corresponding audio signal 186, which can be sent to an amplifier and/or speaker for output.

To facilitate playback of a digital music composition 160, the audio signal translation engine 185 may process embedded data included in the chord objects 165 to generate the audio signals 186 corresponding to the chord notations 161 included within a digital music composition 160. In doing so, the audio signal translation engine 185 may parse the chord notations 161 to extract key information, chord quality, modifiers, and optional slash bass notes. This information can then be mapped to corresponding MIDI note values and intervals, which are combined to generate the corresponding MIDI events. The resulting MIDI events, including note numbers and timing information, may be loaded into a MIDI sequencer for playback through a MIDI sampler to produce the final audio signals 186. Further details of the DAC conversion applied to the chord objects 165 is described below.

While certain portions of this disclosure may describe usage of the music composition applications 150 on mobile electronic devices, it should be understood the music composition applications 150 (and their corresponding functionality) can be executed by any type of computing device 110 including, but not limited to the computing devices 110 described above.

Figure 2:
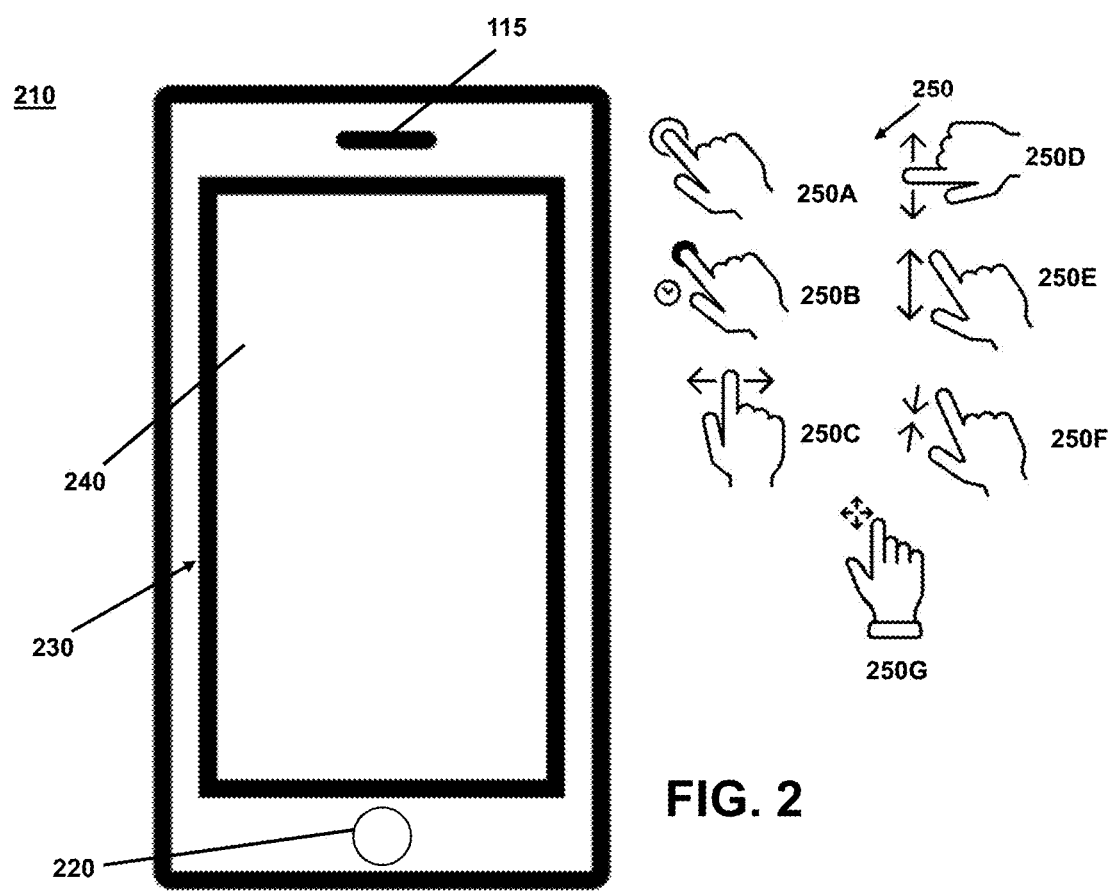
FIG. 2 is an exemplary electronic mobile device in accordance with certain embodiments.

FIG. 2 discloses an exemplary mobile electronic device 210 according to certain embodiments. The mobile electronic device 210 can include, inter alia, one or more audio devices 115, one or more input buttons 220, and one or more touch screen displays 230, each of which includes a capacitive sensing medium 240. In some cases, users or operators of the mobile electronic device 210 may utilize various gestures 250 to make selections and provide inputs via the one or more touch screen displays 230 included on the mobile electronic device 210. Other input mechanisms (e.g., mouse devices, keyboards, input buttons 220, etc.) also may be utilized to make selections and provide inputs.

In certain embodiments, each of the one or more touch screen displays 230 can include both a display (e.g., an LCD or liquid crystal display) device and capacitive sensing medium 240 that is configured to detect touches and gestures 250. In some cases, the capacitive sensing medium 240 can be configured to detect the location where the touch screen display 230 is engaged or touched by an object (e.g., a user's figurer or stylus), the time and duration of each engagement or touching of the touch screen display 230, and/or the pressure exerted each instance the touch screen display 230 is engaged or touched. The capacitive sensing medium 240 also can to generate signals indicating the detected parameters. The capacitive sensing medium 240 can include one or more sensors that utilize capacitive sensing, resistive sensing, surface acoustic wave sensing, strain gauges, force sensitive resisters, load cells, pressure plates, piezoelectric transducers, and/or the like to detect the aforementioned parameters.

The capacitive sensing medium 240 can be configured to detect various types of gestures 250. Exemplary gestures 250 that may be utilized to provide inputs via the capacitive sensing medium 240 and/or touch screen displays 230 can include:

Tap Gestures 250A: Touch or tap one finger on the touch screen display 230.

Tap-and-Hold Gestures 250B: Touch the touch screen display 230 and hold in place for a predetermined period of time (e.g., 1-3 seconds).

Swipe Gestures 250C: Touch the touch screen display 230, and move or drag a finger in a direction across touch screen display 230.

Scroll Gestures 250D: Move or drag one finger across the touch screen display 230 without lifting, and capable of moving bi-directionally (e.g., up-and-down or side-to-side).

Zoom Gestures: Place two fingers on the touch screen display 230 near each other and spread them apart to perform a zoom in gesture 250E, or move them toward each other to perform a zoom out gesture 250F (or vice versa).

Drag-and-Drop Gestures 250G: Tapping and holding an item with a finger, then moving it to a desired location before releasing it to place the item.

Other types of gestures 250 also may be utilized to provide inputs and selections via the capacitive sensing medium 240 and/or touch screen displays 230. It should be understood that any portion of this disclosure that describes selections, inputs, or the like being received on an interface can be provided by usage of one or more of the aforementioned gestures 250.

In comparison to many traditional desktop computer monitors, the touch screen displays 230 on mobile electronic devices 210 are often smaller in size (e.g., 3-7 inches when measured diagonally across the touch screen displays 230). Additionally, unlike many desktop computing devices, the primary means to provide inputs to the electronic mobile devices 210 is often by receiving inputs, selections, and/or gestures 250 via the touch screen displays 230.

The music composition applications 150 can be configured to provide interfaces that are optimized for the smaller displays of mobile electronic devices 210, and which utilize gesture-based input functionality to easily define notations (e.g., chord notations 161, lyric notations 162, etc.) for digital music compositions 160. Additionally, the gesture-driven composer environment 135 enables the chord notations 161 to be precisely aligned and correlated with both the beat information and lyric information. This can significantly increase usability of the music composition applications 150 in comparison to other traditional applications, which commonly attempt to transition a desktop composition application to a mobile environment and which do not allow for precise alignment of chord notations 161. In many cases, the interfaces and functionality of the music composition applications 150 described herein prevent cluttering of the interfaces with voluminous selection options, avoid navigating through extensive menu hierarchies, and capitalize on the usage of gestures 250 to facilitate rapid entry and customization of notations used to create and edit digital music compositions 160.

The exemplary mobile electronic device 210 illustrated in FIG. 2 is provided as an example of a mobile electronic device 210, but it should be recognized that mobile electronic devices 210 can have other configurations and functionalities. For example, in some cases, mobile electronic devices may include mechanical keyboards (e.g., mechanical QWERTY keyboards), mechanical scrollers, and/or other input buttons 220 to provide inputs or make selections. Additionally, as mentioned above, the mobile electronic devices 210 can include wearable devices and/or other devices that are portable or transportable in nature. The mobile electronic devices 210 can be varied in other ways as well.

It should be understood that any portion of this disclosure that describes a function as being performed on a mobile electronic device 210 can additionally, or alternatively, be executed by other types of computing devices 110 (e.g., desktop computer devices, laptops, etc.). Moreover, any portion of this disclosure that describes usage of gestures 250 (e.g., to make selections) can additionally, or alternatively, be performed by generating or providing inputs through other types of input devices (e.g., keyboards, mouse devices, etc.).

FIGS. 3A-3F illustrate exemplary graphical user interfaces 300 that may be generated and displayed by the music composition application 150 according to certain embodiments.

In certain embodiments, when a new digital music composition 160 is being created, the end-user may initially access an interface that enables the end-user to select the time signature (e.g., a 4/4 time signature, 6/8 time signature, ¾ time signature, 2/4 time signature, and/or other time signature) and a tonal center or key (e.g., C major, D major, F#major, Bb major, and/or other key) for the new digital music composition 160. The end-user may then utilize some of all of the interfaces described in FIGS. 3A-3F to input and customize chord notations 161 and lyric notations 162 for the digital music composition 160.

Figure 3A:
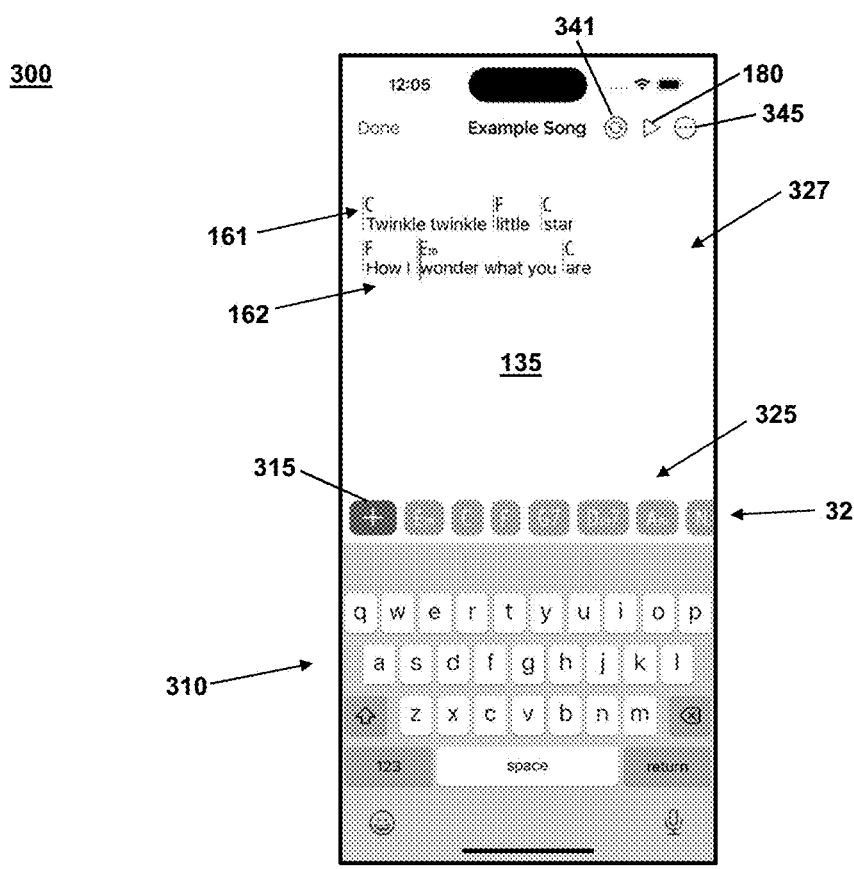
FIG. 3A is an exemplary interface that may be displayed by a music composition application in accordance with certain embodiments.

FIG. 3A illustrates an exemplary graphical user interface (GUI) 300 that may be presented by the CALC module 130 of the music composition application 150. The interface is configured in the LAC mode 170A, which enables the end-user to input and customize both chord notation 161 and lyric notations 162 for the digital music composition 160 in a gesture-driven composer environment 135, and to align or position the chord notation 161 and lyric notations 162 with each other.

The GUI 300 provides a gesture-driven composer environment 135 that includes a virtual keyboard 310, a chord selection section 320, and composition output section 137.

The virtual keyboard 310 corresponds to a software-based keyboard displayed on a touchscreen of a mobile electronic device 210. In this example, the virtual keyboard 310 is arranged in QWERTY layout that comprises gesture-selectable options corresponding to letters, a spacebar, delete key, return key, and other common keyboard functions. The touch-sensitive nature of the virtual keyboard can enable an end-user to interact with these options through tap gestures 250A and/or other types of gestures 250 to input or edit text corresponding to lyric notations 162. When the textual content corresponding to the lyric notations 162 is input via the virtual keyboard 310, the lyric notations 162 will appear in the gesture-driven composer environment 135 located above the virtual keyboard.

The virtual keyboard 310 is augmented with a chord selection section 320, which includes a custom toolbar that is situated directly above virtual keyboard 310. The chord selection section 320 comprises a plurality of selectable options corresponding to chord notations 161. The selectable options presented in the chord selection section 320 is gesture-scrollable, such that performing a gesture 250 (e.g., such as a scroll gesture 250D or swipe gesture 250C in the horizontal direction) allows the end-user to access additional chord notations 161. An end-user can perform a tap gesture 250A and/or other gesture to insert desired chord notations 161 into the digital music composition 160 displayed in the gesture-driven composer environment 135.

The chord selection section 320 also includes a custom chord option 315, which enables the end-user to create and customize new chord notations 161 (as described in further detail below with reference to FIG. 3C). The custom chord notations 161 created by the end-user can be appended to as selectable options included in the chord selection section 320 and/or can be inserted into the digital music composition 160 displayed in the gesture-driven composer environment 135.

The composition output section 137 of the gesture-driven composer environment 135 displays a current state of the digital music composition 160. In FIG. 3A, the gesture-driven composer environment 135 is configured in the LAC mode 270A, which enables an end-user to view, define, and edit chord notations 161 and lyric notations 162 corresponding to the digital music composition 160. End-users may utilize various gestures 250 to align or position the notations to create associations with between the chord notations 161 and lyric notations 162, and this alignment or positioning of the chord notations 161 and lyric notations can be stored in alignment information 163 for the digital music composition 160.

In the LAC mode 270A, the digital music composition 160 can be displayed in the composition output section 137 as a series of rows that are vertically arranged. Each row can segmented into a lyric portion and a chord portion. For example, in each row, the lyric notations 162 may be presented beneath the chord notations 161, and the gesture-driven composer environment 135 may store alignment information 163 that correlate positions of lyric notations 162 with the chord notations 161 that are situated vertically adjacent to each other.

As an end-user is composing or creating a digital music composition 160 in the LAC mode 170A, the end-user can perform a gesture 250 (e.g., a tap gesture 250A) to change the location of a cursor to a desired portion of lyric text in order to edit or modify the existing lyric notations 162 that have already been added using the virtual keyboard 310. Additionally, the end-user may position the cursor to insert chord notations 161 at desired locations. For example, if an end-user wishes to enter a chord notation 161 at specific location, the end-user may initially execute a gesture 250 to reposition the cursor at a desired location, and may then insert a chord notation 161 by executing a gesture 250 (e.g., tap gesture 250A) on a chord option presented in the chord selection section 320 that is augmented to the virtual keyboard 320. Upon selection of a desired chord option in the chord selection section 320, the corresponding chord notation 161 may be inserted at the cursor location above the corresponding lyric notation 162 directly adjacent to the cursor, and the alignment or associations between the chord notation 161 and lyric notation 162 may be stored in the alignment information 163 with the digital music composition 160. The insertion of this chord notation indicates that a musician should commence playing the corresponding chord simultaneously with the vocalization or recitation of the associated lyric text, as displayed at the aligned position on the screen or sheet music, and this correlation between the chords and lyrics is stored with the alignment information 163 for digital music composition 160. This gesture-driven insertion technique enables the end-user to rapidly insert chord notations 161 into the digital music composition being created 160 in an intuitive manner.

In the LAC mode 270A, the alignment information 163 that is collected and stored by the music composition application 150 can be based on the manner in which the end-user utilizes gestures 250 to position the chord notations 161 relative to the lyric notations 162. For example, when an end-user utilizes one or more gestures 250 to insert a chord notation 161 above a particular lyric notation 162, the gesture-driven composer environment 135 can detect this alignment and associate the chord notation 161 with the corresponding lyric notation 162.

The gesture-driven composer environment 135 also enables chord notations 161 to be easily removed or deleted from the digital music composition 160. In some examples, an end-user can perform a tap gesture 250A and/or other gesture 250 to initially select a chord notation 161 displayed in the composition output section 137, and subsequently tap or select the delete button presented on the virtual keyboard 310 to remove or delete the chord notation 161.

The top of the GUI 300 also includes several selectable options. An audio playback option 180 enables the digital music composition 160 displayed in the composition output section 137 to be converted to analog audio signals 186 and output via an audio device 115. An undo option 341 enables an end-user to undo a most recent change to the digital music composition 160. A menu option 345 can be selected to access a menu of different functions, some of which can enable the end-user to toggle or switch between different editing modes (e.g., such as the LAC mode 170A, BAC mode 170B, and/or SAC mode 170C).

Figure 3B:
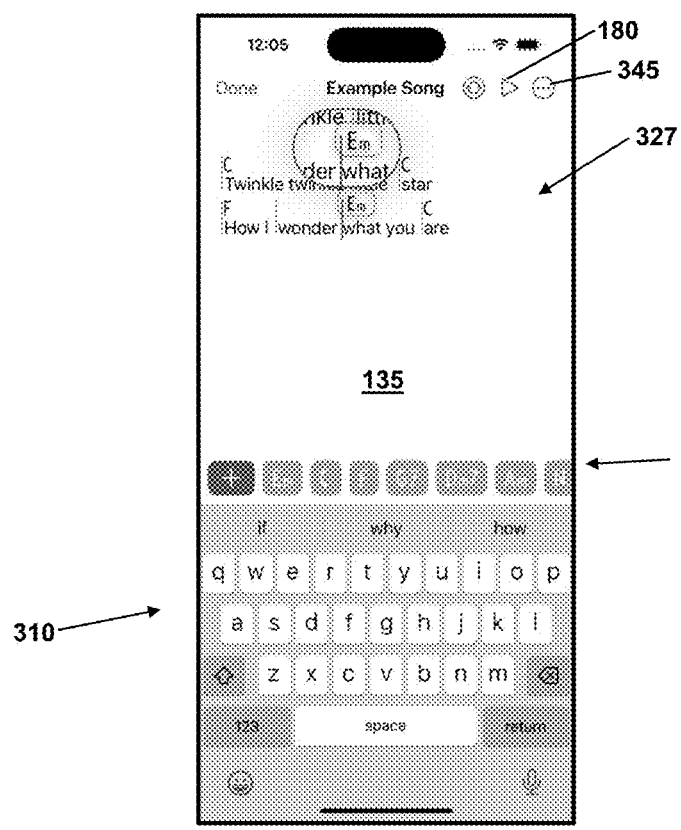
FIG. 3B is another exemplary interface that may be displayed by a music composition application in accordance with certain embodiments.

FIG. 3B illustrates how the gesture-driven composer environment 135 also facilitates rapid and user-intuitive repositioning of chord notations 161 to desired locations in the digital music composition 160 that is displayed. In some examples, when an end-user desires to move or relocate a chord notation 161, a tap-and-hold gesture 250B, a drag-and-drop gesture 250G, and/or other gesture 250 can be performed to move the chord notation 161 to a desired cursor location in the composition output section 137, causing the chord notation 161 to snap into place at a nearest cursor location. For instance, a long press may be performed to select a chord notation 161 positioned at a first location above a lyric notation 162 and, thereafter, the chord notation 161 can be moved or dragged to a second location above a different lyric notation 162. When dragged or moved to the second location in the composition output section 137, the gesture-driven composer environment 135 may detect the current location of the end-user's finger and cause the chord notation 161 to be snapped to a cursor location nearest to the position where the finger released the chord notation 161. The gesture-driven composer environment 135 can enable the chord notation 161 to be repositioned along the same row as its original location and/or across different rows of the digital music composition 160. This gesture-driven repositioning technique enables the end-user to easily move or reposition chord notations 161 to desired cursor locations throughout a digital music composition 160 in a user-friendly and intuitive manner.

When the end-user repositions or moves chord notations 161 to new positions within the digital music composition 160 being created, the gesture-driven composer environment 135 can detect or determine the new positioning information for the chord notations 161 and update the alignment information 163 for the chord notation 161 accordingly. In the above example, initial alignment information 163 may be stored that indicates the initial position of the chord notation 161 at a first location corresponding to the first lyric notation 162. After the chord notation 161 is repositioned using one or more gestures 250, the alignment information 163 can be updated to associate the chord notation 161 with its updated location corresponding to the second lyric notation 162. This seamless updating of the alignment information 163 to correlate chord notations 161 with different lyric notations 162 can be performed in a background process executed by the gesture-driven composer environment 135 without impacting the user's experience or requiring the user to reinsert the chord notation 161.

Figure 3C:
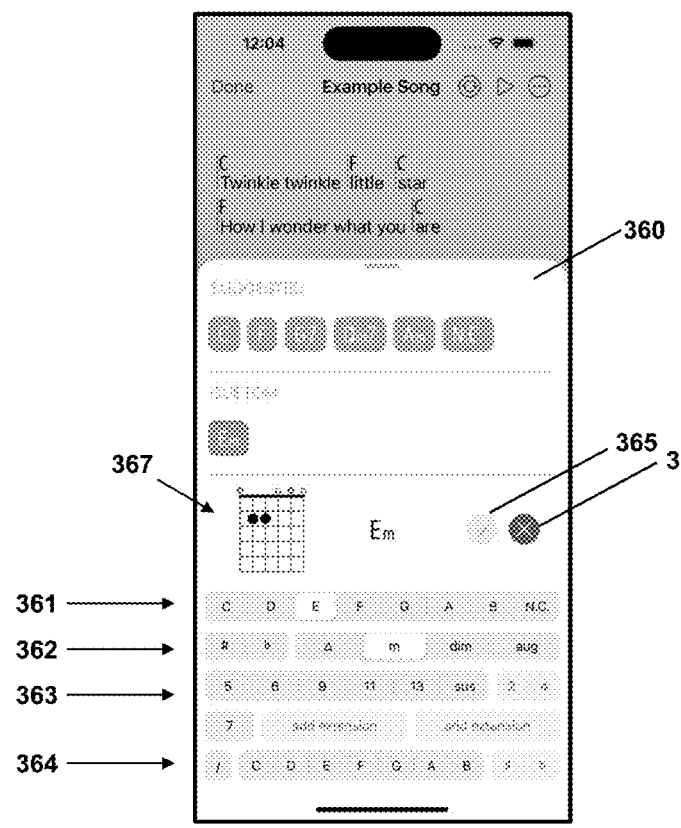
FIG. 3C is another exemplary interface that may be displayed by a music composition application in accordance with certain embodiments.

FIG. 3C illustrates an exemplary GUI 300 that facilitates the creation of custom chord notations 161. The interface may be displayed in response to selection of the custom chord option 315. The interface includes a chord customization panel 360 that enables chord notations 161 to be created or modified.

In certain embodiments, the chord customization panel 360 may be configured as an overlay that is presented on top of the virtual keyboard 310 and/or composition output section 137. The chord customization panel 360 comprises various selectable options that permit an end-user to compose chord notations 161 from atomic components, including a first set of selectable options 361 for specifying a letter name of the chord, a second set of selectable options 362 for specifying an accidental for the chord, a third set of selectable options 363 for specifying chord quality indicators, and an a first fourth of selectable options 364 for specifying optional bass "slash" note letter and accidental for the chord. The desired options (361, 362, 363, and 364) can be selected using a tap gesture 250A or other gesture 250 to assemble a custom chord notation 361.

In certain embodiments, the chord customization panel 360 also may include an instrument visualization diagram 367 that provides a visual representation of how the chord notation 161 being defined or created should be played on an instrument. In this example, the instrument visualization diagram 367 corresponds to a guitar chord chart that visualizes the fingering and placement of fingers on a fretboard to play the chord being created. The guitar chord chart comprises a grid representing the strings and frets, with dots or symbols indicating where to press (and the hollow circles at the top of the chart indicating that these strings should be played "open", without any fingers placed on any frets). In some embodiments, the chart also may be supplemented with numbers identifying which fingers to use. The instrument visualization diagram 367 or guitar chord chart can be dynamically updated as an end-user selects different options included in the chord customization panel 360 for defining the custom chord notation 161. Although the instrument visualization diagram 367 in this example corresponds to a guitar chord chart, it should be understand that other diagrams, charts, or visualizations also may be displayed to demonstrate how the chord should be played on other types of instruments (e.g., pianos, keyboards, etc.).

When a new chord notation 161 is constructed, a confirmation option 365 can be tapped or selected, causing the new chord notation 161 to be added into the list of chord symbols displayed in the chord selection section 320. A swipe down gesture or other gesture 250 can be performed to dismiss or clear the chord customization panel 360 and the newly constructed chord notation 161 will become available in the chord selection section 320 located above the virtual keyboard 310, allowing the chord notation 161 to be appended to lyric notations 162 displayed in the composition output section 137 and/or inserted into the digital music composition 160 presented in the composition output section 137. The chord customization panel 360 also includes a cancellation option 366 that can be tapped or selected to erase, delete, or reset the custom chord notation 161 that being currently being designed in the chord customization panel 360.

Figure 3D:
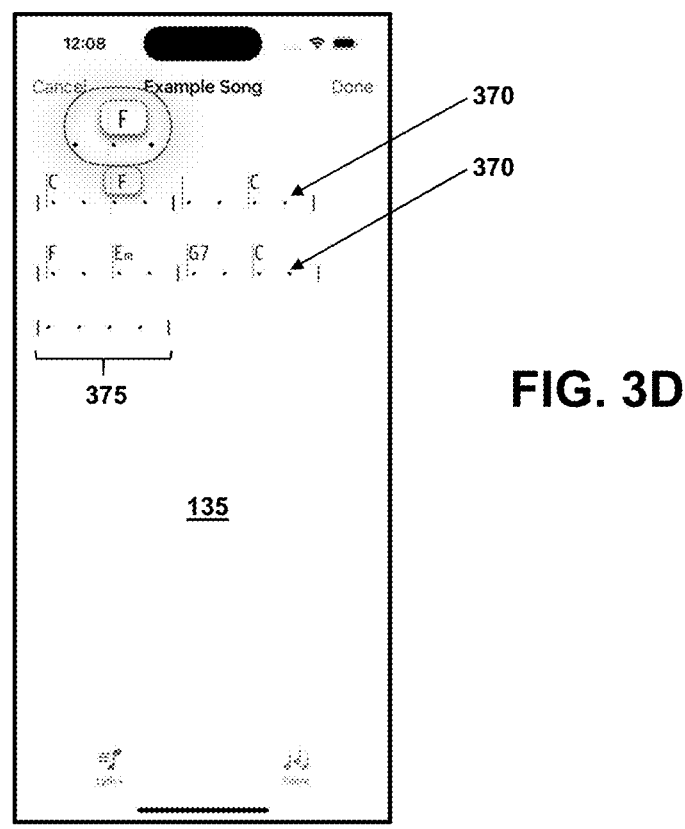
FIG. 3D is another exemplary interface that may be displayed by a music composition application in accordance with certain embodiments.

FIG. 3D illustrates an exemplary GUI 300 that may be presented when the music composition application 150 is transitioned to the BAC mode 170B. The BAC mode 170B provides end-users the ability to specify and/or customize rhythm information that is not typically represented on a lyrics sheet. This rhythm information can be used to programmatically generate musical accompaniments similar to what a live musician might play. This association of rhythm information with chord notations 161 on a lyrics sheet represents a new way to compose music, and can forms the basis of a more expressive audio playback experience. As a digital music composition 160 is being created, an end-user can play back the accompaniment concurrently as the lyrics are being composed.

In some exemplary scenarios, an end-user may start composing a digital music composition 160 in the LAC mode 170A, and then may select an option (e.g., which, in some cases, may be accessible via the menu 345) to transition the music composition application 150 to the BAC mode 170B. As explained above, the chord notations 161 may be stored in chord objects 165 with embedded information and, after being inserted into the digital music composition 161 while configured in the LAC mode 161, the chord notations 161 may be imported for display in the BAC mode 170B.

In the BAC mode 170B, the gesture-driven composer environment 135 permits end-users to precisely position chord notations 161 on beat notations 370 within measures 375. In the example of FIG. 3D, the chord notations 161 are displayed above dots that indicate beats 370, showing the alignment of the chord notations 161 with corresponding beat information. Boundaries of the measures 375 are indicated with "|" bar line symbols.

The beat notations 170 displayed in the composition output section 137 correspond to the time signature of the song. For example, a 4/4 song will have four beats per measure, while a ¾ song will have three beats per measure. In certain embodiments, the gesture-driven composer environment 135 may enforce restrictions on locations where chord notations 161 can be placed. For example, in a compound meter such as 6/8, chord notations 161 may only be placed on the emphasized beat positions (multiples of three). In 6/8 meter, six dots will be displayed, but chord notations 161 may only be placeable on the first or fourth dots in each measure 175.

In certain embodiments, when configured in the BAC mode 170B, chord notations 161 cannot be added, removed, or reordered. However, the chord notations 161 can be moved using gestures 150 (e.g., by performing long-press and drag-and-drop gestures) to contiguous beat positions, up until the nearest prior and subsequent chord notations 161 or the boundaries of the editing environment. The gesture-driven composer environment 135 enables the chord notation 161 to smoothly follow or track the gesture 250 used for moving or sliding chord notations 161 to appropriate locations, while the cursor is drawn at the nearest valid location where the chord notation 161 can be placed. When the gesture ends, the chord notation 161 snaps to this nearest valid beat location.

The alignment or positioning of the chord notations 161 with the beats 370 can be stored with the alignment information 163 for the digital music composition 160 being created. When the end-user exits the BAC mode 170B, the beat/chord alignment information can be propagated and/or accessed across other editor modes, including the LAC mode 170A and BAC mode 270B. The beat assignment position data is also can be propagated back to the lyrics view (in LAC mode 170A) and the changes can be heard in the musical accompaniment playback of the digital music composition 160 (e.g., in response to selecting the audio playback option 180).

Figure 3E:
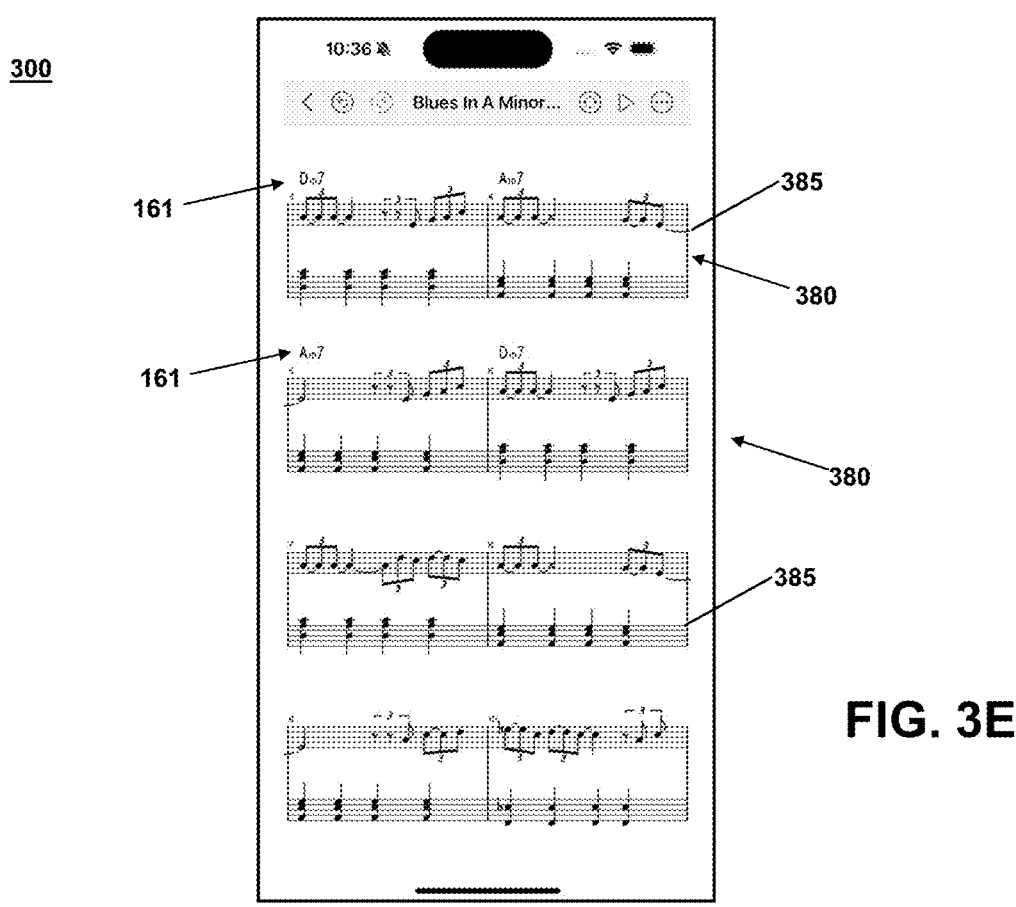
FIG. 3E is another exemplary interface that may be displayed by a music composition application in accordance with certain embodiments.

FIG. 3E illustrates an exemplary GUI 300 comprising a musical score representation when a digital music composition 160 is displayed in the SAC mode 170C. The SAC mode 170C also provides a gesture-driven composer environment 135 for editing a musical score 380, with musical notations included on a virtual staff 385 and chord notations 161 placed on beats in measures above the virtual staff 385. Any of the musical notations (e.g., musical notes, rests, etc.) can be tapped or selected to facilitate editing of the notations.

In some embodiments, an end-user may start composing a digital music composition 160 in the LAC mode 170A and BAC mode 170B, and then may select an option (e.g., which, in some cases, may be accessible via the menu 345) to transition the music composition application 150 to the SAC mode 170C. As explained above, the chord notations 161 may be stored in chord objects 165 with embedded information and, after being aligned with lyric notations 162 and/or beat notations 370 for the digital music composition 160, the chord notations 161 may be imported for display in the SAC mode 170C.

In the SAC mode 170C, chord notations 161 are repositioned over a musical score 380 accordingly. In certain embodiments, the functionality of the SAC mode 170C operates to translate the chord notations 161 and the associated rhythm or beat information into a musical score. In this score view, end-users can insert, modify, and/or edit any of musical notations (e.g., including music notes, rests, etc.) to write or compose more complex melodies and harmonies. Additionally, end-users can make adjustments to the chord notations 161 on the musical score, which can then propagated back across to the other editing modes (including the LAC mode 170A and/or BAC mode 170B).

Figure 3F:
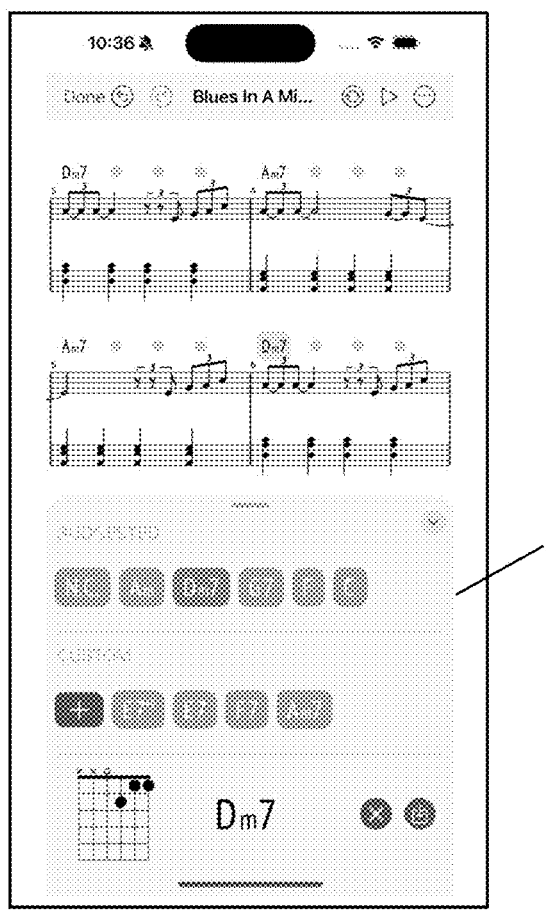
FIG. 3F is another exemplary interface that may be displayed by a music composition application in accordance with certain embodiments.

FIG. 3F illustrates an exemplary GUI 300 for editing or modifying a chord notation 161 when a digital music composition 160 is displayed in the SAC mode 170C. An end-user may tap or select a chord notation 161 for editing. In response, a chord customization panel 360 may be presented to the end-user for customizing or editing the selected chord notation 161 in the same manner described above.

As demonstrated herein, the LAC mode 170A, BAC mode 170B, and SAC mode 170C each provide a gesture-driven composer environment 135 that access the single underlying data structure for a given song or digital music composition 170. Amongst other things, the data structure for the digital music composition 170 may store chord objects 165 that includes embedded information for each of the chord notations 165 which can be accessed and edited across the various modes. Each chord object 165 can be embedded with some or all of the following parameters: a) the text associated with the chord notation 161; b) reference to a data structure that defines the visual characteristics of the chord notation 161; c) position in time information associated with the chord notation 161; d) the musical notes that are associated with chord notation 161 (which can include the octave of the note); e) alignment information 163 that aligns the chord notation 161 with one or more specified lyric notations 162; and/or f) alignment information 163 that aligns or positions the chord notation 161 with one or more beats 170. As described above, the embedded information corresponding to each chord notation 161 or chord object 165 can be refined across the different editor modes.

Additionally, the propagation of updated chord information throughout the various editor modes can be performed periodically at checkpoints during the editing process. At a checkpoint, a diffing algorithm can be executed by the music composition application 150 can determine changes that have been made to the ordered list of chord notations 161 in the current editing mode, resulting in a list of deletions and additions of chord notations 161 that transform the data store's ordered list of chord notations 161 into the edited ordered list of chord notations 161.

A deletion of chord notation 161 can be processed by removing the chord notation 161 from its position on a score or within the lyrics text. Additions of chord notations 161 in the SAC mode 170C can be propagated to the other editor modes by identifying the lyrics text location of the previous chord notation, and inserting the added chord notation 161 into the lyrics text at a subsequent text position. Additions of chord notations 161 in the LAC mode 170A can be propagated into the other editor modes by identifying the measure and beat positions of the previous and subsequent chord notations. If possible, the new notation may be inserted at a beat between these two measures and beat positions. Otherwise, an empty measure can be inserted and the new chord notation 161 can be placed at the first beat in the new measure. The subsequent chord notation can be moved into the new measure if it would otherwise be before the new measure.

At any point during the creation of a digital music composition 160, an end-user can select an audio playback option 180 to listen to the current state of the digital music composition 160 (and, if desired, may modifications and subsequently replay the modified digital music composition 160).

As explained above, an audio signal translation engine 185 a synthesizer and/or sampler that translates the composition in digital form to analog audio signals 186. In performing this DAC translation, the audio signal translation engine 185 can utilize some or all of the embedded information stored in the chord objects 165 for the digital musical composition 160 to more precisely generate the analog audio signals 186 corresponding to the chord notations 161.

In certain embodiments, the audio signal translation engine 185 can utilize the embedded information to parse the textual chord inputs for the chord key (e.g. F, G#, E6), the chord quality (e.g. major, minor, diminished), other chord modifiers (e.g. sus, 6, 7, +9, −11), and/or an optional slash bass key (e.g. /C, /D#, /B♭). The chord key can then associated with a corresponding note value (e.g., MIDI note value). For example, the key of E could map to MIDI note value 52. The quality and other modifiers can be mapped to sets of intervals relative to the chord key. These intervals indicate the relative positions of the additional notes of the chord. For example, a major quality would indicate the two intervals of [+4, +7]. An E major chord would then combine E=>52 with major=>[+4, +7] to formulate E Major=[52, 52+4, 52+7]=[52, 56, 59]. These MIDI notes might then be transposed by octave offsets (+/−multiples of 12) to form different voicings of the chord.

Notes might be duplicated and doubled across octaves, so that E Major chord might end up with a voicing such as: [(52−12), (59−12), 52, 56]=[40, 47, 52, 56]. The optional slash note can indicate the lowest note of the chord, which can be added as a final step. Building on the above example, E Major/B can add a low B note at MIDI value 35 to form a possible final voicing of [35, 40, 47, 52, 56]. The audio signal translation engine 185 also can combine rhythmic timing (position and duration) information with these MIDI note numbers to form MIDI events. An example MIDI event could be (note_number=54, start_time=8, end_time=9). After generating an appropriate set of MIDI events, the events can then be loaded into a MIDI sequencer for playback through a MIDI sampler.

Other techniques also can be utilized by the audio signal translation engine 185 to translate digit music compositions 160 to analog audio signals 186 for audio playback.

FIG. 4 illustrates a flow chart for an exemplary method 400 according to certain embodiments. Method 400 is merely exemplary and is not limited to the embodiments presented herein. Method 400 can be employed in many different embodiments or examples not specifically depicted or described herein. In some embodiments, the steps of method 400 can be performed in the order presented. In other embodiments, the steps of method 400 can be performed in any suitable order. In still other embodiments, one or more of the steps of method 400 can be combined or skipped. In many embodiments, system 100 and/or music composition application 150 can be configured to perform method 400 and/or one or more of the steps of method 400. In these or other embodiments, one or more of the steps of method 400 can be implemented as one or more computer instructions configured to run at one or more processing devices 102 and configured to be stored at one or more non-transitory computer storage devices 101. Such non-transitory memory storage devices 101 can be part of a computer system such as system 100, computing device 110, and/or server 120.

In step 410, one or more gestures 250 are detected within a gesture-driven composer environment 135 for inserting lyric notations 162 in a digital music composition 160. In some examples, an end-user may define the lyric notations 162 by inputting gestures 250 via a virtual keyboard 310 accessible in a LAC mode 170A. In response to receiving the gestures 250, a composition output section 327 of the gesture-driven composer environment 135 may be updated to display the lyric notations 162.

In step 420, one or more gestures 250 are detected within the gesture-driven composer environment 135 for inserting chord notations 161 into the digital music composition 160. In some examples, the end-user may utilize gestures 250 to select chord options presented in a chord selection section 320 of the gesture-driven composer environment 135 configured in a LAC mode 170A. The chord selection section 320 may present options comprising pre-stored or pre-defined chord notations 161 and/or custom chord notations 161, which may be defined by inputting gestures 250 via a chord customization panel 360. In response to selecting the chord notations 161, a composition output section 327 of the gesture-driven composer environment 135 may be updated to display the chord notations 161 above lyric notations 162 at a current cursor position within the composition output section 327 of the gesture-driven composer environment 135. Additionally, the end-user may execute drag-and-drop gestures 250G and/or other gestures 250 to reposition the chord notations 161 above different lyric notations 162 within the composition output section 327 of the gesture-driven composer environment 135.

In step 430, alignment information 163 is determined that correlates positioning of the chord notations 161 relative to the lyric notations 162. This alignment information 163 may be generated based on the end-user's gestures and interactions within the gesture-driven composer environment 135. For example, when the end-user positions a chord notation 161 above or near a specific lyric notation 162, the music composition application 150 may automatically detect and store this spatial relationship, creating a link or association between the chord notation 161 and the corresponding lyric text in the digital music composition 161. If a chord notation 161 is moved to a different position (e.g., using a drag-and-drop gesture 250G and/or other gesture 250), the alignment information 163 may be automatically updated by the music composition application 150 based on the detected position chord notation 151.

In step 440, one or more gestures 250 are detected within the gesture-driven composer environment 135 for aligning the chord notations 161 with beat notations 170. In some examples, these gestures 250 may include drag-and-drop gestures 250 to position chord notations 161 on specific beat notations 170 within measures. The music composition application 150 may interpret these gestures 250 to precisely align chord notations 161 with rhythmic elements, allowing users to define the exact timing and duration of each chord within the musical composition 160. The alignment information 163 may be updated to store data that correlates positioning of the chord notations 161 relative to the beat notations 170 based, at least in part, on the gesture 250 detected in the gesture-driven composer environment 135. For example, when the end-user positions a chord notation 161 above or near a specific beat notation 170, the music composition application 150 may automatically detect and store this spatial relationship, creating a link or association between the chord notation 161 and the corresponding beat notation 170 in the digital music composition 161.

In step 450, the chord notations, the lyric notations, and the alignment information are stored and/or associated with the digital music composition.

In step 460, the digital music composition is translated to analog audio signals 186 for playback. This translation process may involve utilizing the embedded information stored in chord objects 165 for the chord notations 161 to generate appropriate MIDI events. An audio signal translation engine 185 may then convert these MIDI events into analog waveforms that can be output through audio devices 115, allowing users to hear an accurate representation of their composed digital music composition 160.

As evidenced by the disclosure herein, the inventive techniques set forth in this disclosure are rooted in computer technologies that overcome existing problems in known music applications, including problems dealing with generating digital music compositions on mobile electronic devices. The technologies described in this disclosure provide a technical solution for overcoming the aforementioned limitations (as well as other limitations) associated with known techniques and systems. In many cases, the technologies provide improved gesture input mechanisms and specially configured interface environments that allow for rapid entry of music notations (e.g., chord notations, lyric notations, etc.) on mobile electronic devices, which permit beats or rhythms to be defined in mobile environments. This technology-based solution marks an improvement over existing systems.

In certain embodiments, an application is stored on a mobile electronic device comprising a touch screen display that includes a capacitive sensing medium, one or more processing devices, and one or more non-transitory storage devices for storing instructions for the application. Execution of the instructions by the one or more processing devices, causes the mobile electronic device to generate a gesture-driven composer environment on the touch screen display. This environment can facilitates the creation of a digital music composition based on gestures detected via the capacitive sensing medium. The gesture-driven composer environment is configured to detect gestures for defining and inserting lyric notations and chord notations corresponding to the digital music composition, determine alignment information that correlates positioning of the chord notations relative to the lyric notations, store the chord notations, lyric notations, and alignment information with the digital music composition, and update the touch screen display to visualize the chord notations and lyric notations in a manner that visually aligns them. Additionally, in response to detecting a selection of an audio playback option, the application translates at least a portion of notations stored with the digital music composition to analog audio signals to facilitate playback.

In certain embodiments, translating the notations stored with the digital music composition to analog audio signals involves parsing the chord objects corresponding to the chord notations to generate a set of notes or events associated with timing information for each chord notation, and generating the analog audio signals using a sequencer or sampler.

In certain embodiments, the lyric notations and chord notations are inserted into the gesture-driven composer environment when configured in a lyric and chord (LAC) mode. In this LAC mode, the gesture-driven composer environment arranges the lyric notations in a series of rows and displays the chord notations above corresponding lyric notations, and derives the alignment information based on vertical alignments between the chord notations and the lyric notations.

In certain embodiments, the gesture-driven composer environment is further configured to detect a drag-and-drop gesture applied to a chord notation, reposition the chord notation within the environment based on the detected gesture, determine a new position of the chord notation relative to one or more of the lyric notations, and automatically update the alignment information to reflect the new position of the chord notation relative to one or more of the lyric notations.

In certain embodiments, the gesture-driven composer environment can be transitioned to a BAC (beat and chord) mode that enables the chord notations to be aligned or associated with beat notations for the digital music composition.

In certain embodiments, when configured in the BAC mode, the gesture-driven composer environment is configured to detect drag-and-drop gestures applied to the chord notations, reposition a chord notation relative to a beat notation within a measure of the digital music composition in response to detecting a drag-and-drop gesture, and automatically update the alignment information to reflect an association between the repositioned chord notation and the beat notation.

In certain embodiments, the gesture-driven composer environment can be transitioned to a SAC (score and chord) mode that enables the chord notations to be displayed with a musical score, where the chord notations are displayed above one or more virtual staffs included in the musical score.

In certain embodiments, the chord notations are stored as chord objects in accordance with a data model that enables the chord notations to be propagated to a LAC (lyric and chord) mode that enables insertion and editing of the chord notations and lyric notations, and which enables alignment of the chord notations with the lyric notations, a BAC (beat and chord) mode that displays the chord notations with beat notations, and which enables alignment of the chord notations with the beat notations; and a SAC (score and chord) mode that displays the chord notations with a musical score.

In certain embodiments, a system comprises one or more non-transitory storage devices for storing instructions, one or more processing devices configured to execute the instructions, and a touch screen display that includes a capacitive sensing medium, communicatively coupled to the processing devices. When executed, the instructions cause the processing devices to generate a gesture-driven composer environment on the touch screen display, facilitating the creation of a digital music composition based on detected gestures. The environment detects gestures for defining and inserting lyric and chord notations, determines alignment information correlating their positioning, stores this information with the composition, updates the display to visually align the notations, and translates the stored notations to analog audio signals for playback when an audio playback option is selected.

In certain embodiments, the translation of notations to analog audio signals in the system involves parsing chord objects to generate notes or events with timing information for each chord notation, and generating the analog audio signals using a sequencer or sampler.

In certain embodiments, within the system, lyric and chord notations are inserted into the gesture-driven composer environment when in a lyric and chord (LAC) mode. In this mode, lyric notations are arranged in rows with chord notations displayed above, and alignment information is derived from their vertical alignments.

In certain embodiments, the gesture-driven composer environment in the system is further configured to detect drag-and-drop gestures applied to chord notations, reposition them based on these gestures, determine their new positions relative to lyric notations, and automatically update the alignment information accordingly.

In certain embodiments, the gesture-driven composer environment in the system can transition to a BAC (beat and chord) mode, enabling chord notations to be aligned or associated with beat notations for the digital music composition.

In certain embodiments, when in BAC mode, the system's gesture-driven composer environment detects drag-and-drop gestures on chord notations, repositions them relative to beat notations within measures, and automatically updates alignment information to reflect these new associations.

In certain embodiments, the gesture-driven composer environment in the system can transition to a SAC (score and chord) mode, displaying chord notations with a musical score above virtual staffs.

In certain embodiments, within the system, chord notations are stored as chord objects using a data model that allows propagation to LAC, BAC, and SAC modes, each offering specific functionalities for insertion, editing, alignment, and display of chord and lyric notations.

In certain embodiments, a computerized method implemented via execution of computing instructions by processing devices stored on non-transitory storage devices generates a gesture-driven composer environment on a touch screen display. This environment facilitates digital music composition creation based on gestures detected via a capacitive sensing medium, detecting gestures for defining and inserting lyric and chord notations, determining alignment information correlating their positioning, storing this information with the composition, and updating the display to visually align the notations.

In certain embodiments, the computerized method further includes translating stored notations to analog audio signals for playback when an audio playback option is selected, involving parsing chord objects to generate notes or events with timing information and using a sequencer or sampler to generate the analog signals.

In certain embodiments, the computerized method involves inserting lyric and chord notations in a lyric and chord (LAC) mode, arranging lyric notations in rows with chord notations above, deriving alignment information from vertical alignments, and allowing repositioning of chord notations via drag-and-drop gestures with automatic alignment information updates.

In certain embodiments, the computerized method allows transitioning to a BAC (beat and chord) mode, enabling chord notations to be aligned with beat notations. In this mode, drag-and-drop gestures can reposition chord notations relative to beat notations within measures, with automatic updates to alignment information reflecting these new associations.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. An application stored on a mobile electronic device comprising a touch screen display that includes a capacitive sensing medium, one or more processing devices, and one or more non-transitory storage devices for storing instructions for the application, wherein execution of the instructions by the one or more processing devices causes the mobile electronic device to:

generate, on the touch screen display of the mobile electronic device, a gesture-driven composer environment that facilitates the creation of a digital music composition based on gestures detected via the capacitive sensing medium, wherein the gesture-driven composer environment is configured to:

detect, via the capacitive sensing medium of the touch screen display, the gestures for defining and inserting lyric notations corresponding to the digital music composition;

detect, via the capacitive sensing medium of the touch screen display, the gestures for defining and inserting chord notations corresponding to the digital music composition;

determine alignment information that correlates positioning of the chord notations relative to the lyric notations;

store the chord notations, the lyric notations, and the alignment information with the digital music composition; and update the touch screen display to visualize the chord notations and the lyric notations in a manner that visually aligns the chord notations and the lyric notations; and in response to detecting a selection of an audio playback option, translate at least a portion of notations stored with the digital music composition to analog audio signals to facilitate playback of the digital music composition.

2. The application of claim 1, wherein translating at least a portion of notations stored with the digital music composition to analog audio signals comprises parsing the chord objects corresponding to the chord notations to generate a set of notes or events with timing information for each chord notation, and generating the analog audio signals using a sequencer or sampler.

3. The application of claim 1, wherein:
the lyric notations and chord notations are inserted into the gesture-driven composer environment when configured in a lyric and chord (LAC) mode;
in the LAC mode, the gesture-driven composer environment:
arranges the lyric notations in a series of rows and displays the chord notations above corresponding lyric notations; and
derives the alignment information based on vertical alignments between the chord notations and the lyric notations.

4. The application of claim 3, wherein the gesture-driven composer environment is further configured to:
detect a drag-and-drop gesture applied to a chord notation;
reposition the chord notation within the gesture-driven composer environment based on the detected drag-and-drop gesture;
determine a new position of the chord notation relative to one or more of the lyric notations; and
automatically update the alignment information to reflect the new position of the chord notation relative to one or more of the lyric notations.

5. The application of claim 1, wherein the gesture-driven composer environment can be transitioned to a BAC (beat and chord) mode that enables the chord notations to be aligned or associated with beat notations for the digital music composition.

6. The application of claim 5, wherein the gesture-driven composer environment, when configured in the BAC mode, is configured to:
detect drag-and-drop gestures applied to the chord notations;
in response to detecting a drag-and-drop gesture, reposition a chord notation relative to a beat notation within a measure of the digital music composition; and
automatically update the alignment information to reflect an association between the repositioned chord notation and the beat notation.

7. The application of claim 1, wherein the gesture-driven composer environment can be transitioned to a SAC (score and chord) mode that enables the chord notations to be displayed with a musical score, and the chord notations are displayed above one or more virtual staffs included in the musical score.

8. The application of claim 1, wherein the chord notations are stored as chord objects in accordance with a data model that enables the chord notations to be propagated to:
a LAC (lyric and chord) mode that enables insertion and editing of the chord notations and lyric notations, and which enables alignment of the chord notations with the lyric notations;
a BAC (beat and chord) mode that displays the chord notations with beat notations, and which enables alignment of the chord notations with the beat notations; and
a SAC (score and chord) mode that displays the chord notations with a musical score.

9. A system comprising:
one or more non-transitory storage devices for storing instructions;
one or more processing devices configured to execute the instructions stored on the one or more non-transitory storage devices;
a touch screen display that includes a capacitive sensing medium, the touch screen display and capacitive sensing medium being communicatively coupled to the one or more processing devices;
wherein execution of the instructions causes the one or more processing devices to:
generate, on the touch screen display, a gesture-driven composer environment that facilitates the creation of a digital music composition based on gestures detected via the capacitive sensing medium, wherein the gesture-driven composer environment is configured to:
detect, via the capacitive sensing medium of the touch screen display, the gestures for defining and inserting lyric notations corresponding to the digital music composition;
detect, via the capacitive sensing medium of the touch screen display, the gestures for defining and inserting chord notations corresponding to the digital music composition;
determine alignment information that correlates positioning of the chord notations relative to the lyric notations;
store the chord notations, the lyric notations, and the alignment information with the digital music composition; and
update the touch screen display to visualize the chord notations and the lyric notations in a manner that visually aligns the chord notations and the lyric notations; and
in response to detecting a selection of an audio playback option, translate at least a portion of notations stored with the digital music composition to analog audio signals to facilitate playback of the digital music composition.

10. The system of claim 9, wherein translating at least a portion of notations stored with the digital music composition to analog audio signals comprises parsing the chord objects corresponding to the chord notations to generate a set of notes or events with timing information for each chord notation, and generating the analog audio signals using a sequencer or sampler.

11. The system of claim 9, wherein:
the lyric notations and chord notations are inserted into the gesture-driven composer environment when configured in a lyric and chord (LAC) mode;

in the LAC mode, the gesture-driven composer environment:
arranges the lyric notations in a series of rows and displays the chord notations above corresponding lyric notations; and
derives the alignment information based on vertical alignments between the chord notations and the lyric notations.

12. The system of claim 11, wherein the gesture-driven composer environment is further configured to:
detect a drag-and-drop gesture applied to a chord notation;
reposition the chord notation within the gesture-driven composer environment based on the detected drag-and-drop gesture;
determine a new position of the chord notation relative to one or more of the lyric notations; and
automatically update the alignment information to reflect the new position of the chord notation relative to one or more of the lyric notations.

13. The system of claim 9, wherein the gesture-driven composer environment can be transitioned to a BAC (beat and chord) mode that enables the chord notations to be aligned or associated with beat notations for the digital music composition.

14. The system of claim 13, wherein the gesture-driven composer environment, when configured in the BAC mode, is configured to:
detect drag-and-drop gestures applied to the chord notations;
in response to detecting a drag-and-drop gesture, reposition a chord notation relative to a beat notation within a measure of the digital music composition; and
automatically update the alignment information to reflect an association between the repositioned chord notation and the beat notation.

15. The system of claim 9, wherein the gesture-driven composer environment can be transitioned to a SAC (score and chord) mode that enables the chord notations to be displayed with a musical score, and the chord notations are displayed above one or more virtual staffs included in the musical score.

16. The system of claim 9, wherein the chord notations are stored as chord objects in accordance with a data model that enables the chord notations to be propagated to:
a LAC (lyric and chord) mode that enables insertion and editing of the chord notations and lyric notations, and which enables alignment of the chord notations with the lyric notations;
a BAC (beat and chord) mode that displays the chord notations with beat notations, and which enables alignment of the chord notations with the beat notations; and
a SAC (score and chord) mode that displays the chord notations with a musical score.

17. A computerized method implemented via execution of computing instructions by one or more processing devices and stored on one or more non-transitory storage devices, the method comprising:
generate, on a touch screen display, a gesture-driven composer environment that facilitates the creation of a digital music composition based on gestures detected via a capacitive sensing medium, wherein the gesture-driven composer environment is configured to:
detect, via the capacitive sensing medium of the touch screen display, the gestures for defining and inserting lyric notations corresponding to the digital music composition;
detect, via the capacitive sensing medium of the touch screen display, the gestures for defining and inserting chord notations corresponding to the digital music composition;
determine alignment information that correlates positioning of the chord notations relative to the lyric notations;
store the chord notations, the lyric notations, and the alignment information with the digital music composition; and
update the touch screen display to visualize the chord notations and the lyric notations in a manner that visually aligns the chord notations and the lyric notations.

18. The computerized method of claim 17, further comprising:
in response to detecting a selection of an audio playback option, translate at least a portion of notations stored with the digital music composition to analog audio signals to facilitate playback of the digital music composition
wherein translating at least a portion of notations stored with the digital music composition to analog audio signals comprises parsing the chord objects corresponding to the chord notations to generate a set of notes or events with timing information for each chord notation, and generating the analog audio signals using a sequencer or sampler.

19. The computerized method of claim 17, wherein:
the lyric notations and chord notations are inserted into the gesture-driven composer environment when configured in a lyric and chord (LAC) mode;
in the LAC mode, the gesture-driven composer environment:
arranges the lyric notations in a series of rows and displays the chord notations above corresponding lyric notations; and
derives the alignment information based on vertical alignments between the chord notations and the lyric notations;
the gesture-driven composer environment is further configured to:
detect a drag-and-drop gesture applied to a chord notation;
reposition the chord notation within the gesture-driven composer environment based on the detected drag-and-drop gesture;
determine a new position of the chord notation relative to one or more of the lyric notations; and
automatically update the alignment information to reflect the new position of the chord notation relative to one or more of the lyric notations.

20. The computerized method of claim 17, wherein:
the gesture-driven composer environment can be transitioned to a BAC (beat and chord) mode that enables the chord notations to be aligned or associated with beat notations for the digital music composition;
the gesture-driven composer environment, when configured in the BAC mode, is configured to:
detect drag-and-drop gestures applied to the chord notations;
in response to detecting a drag-and-drop gesture, reposition a chord notation relative to a beat notation within a measure of the digital music composition; and automatically update the alignment information to reflect an association between the repositioned chord notation and the beat notation.

\* \* \* \* \*